G. H. COBB & A. DRUMTRA.
PIPE COUPLING.
APPLICATION FILED OCT. 16, 1912.
1,122,689.
Patented Dec. 29, 1914.
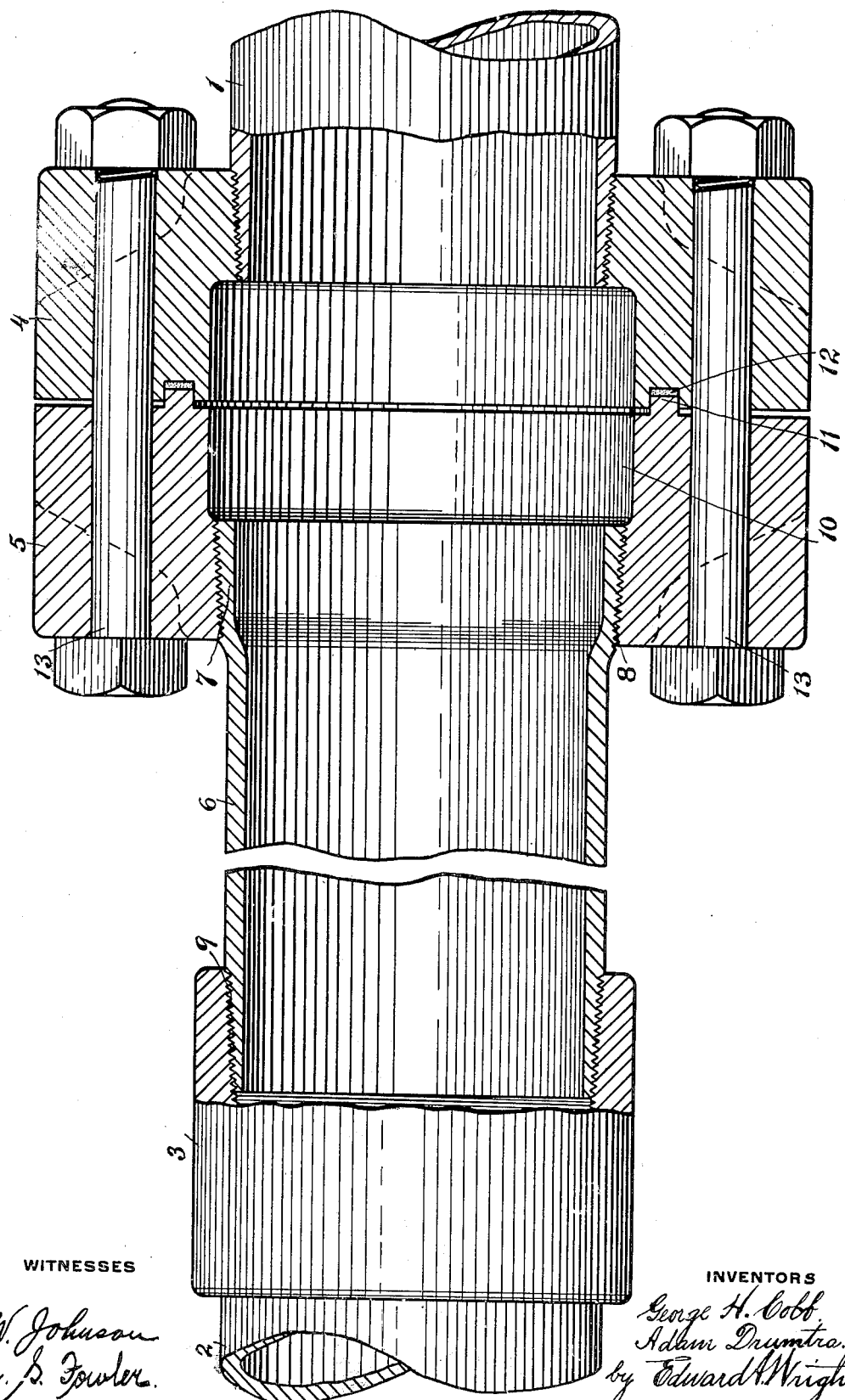
WITNESSES
W. Johnson
A. J. Fowler.
INVENTORS
George H. Cobb
Adam Drumtra.
by Edward A. Wright.
Atty.

UNITED STATES PATENT OFFICE.

GEORGE H. COBB AND ADAM DRUMTRA, OF BINGHAMTON, NEW YORK.

PIPE-COUPLING.

1,122,689.  Specification of Letters Patent.  Patented Dec. 29, 1914.

Application filed October 16, 1912. Serial No. 726,004.

*To all whom it may concern:*

Be it known that we, GEORGE H. COBB and ADAM DRUMTRA, both citizens of the United States, residing at Binghamton, in the county of Broome and State of New York, have invented a certain new and useful Improvement in Pipe-Couplings, of which the following is a specification.

This invention relates to pipe couplings, and particularly to devices of this character having bolted or otherwise secured flange sections and adapted to reunite the ends of a pipe line where the same has been cut for the purpose of renewing a defective section or for inserting a T connection or for other purposes.

Our improvement is especially designed for pipe lines laid in the ground, but may also be used for coupling pipe lines in buildings or elsewhere. Where it is necessary to repair a pipe line laid in the ground, either for removing a split section or for inserting a valve or a branch line connection, it is the practice, where a bolted flange joint is to be inserted, to dig up a sufficient length of the pipe line to spring the adjacent pipe ends out of line with each other while the flanges are put on, and then bring the sections in line and bolt the flanges together. This requires a great amount of labor and time in excavating and filling in such a long trench, nearly all of which work may be saved by means of our improvement with which it is only necessary to uncover the defective pipe section or that portion which is to be removed.

In the accompanying drawing, the figure illustrates in central longitudinal section, one form of pipe coupling embodying our improvement.

According to the construction shown, we provide two flanges, 4 and 5, adapted to be bolted or otherwise secured together, and having inside threaded portions for connection with a pipe section, 1, and a nipple section, 6, respectively. One end of the nipple may be externally threaded as at 9 to fit the usual collar, 3, on pipe section, 2, while the other end is enlarged at 7, and provided with a threaded connection, 8, fitting the threaded portion of the flange, 5, the thread tapering toward the small end of the nipple, so that the flange may be slipped over the smaller portion of the nipple and then screwed up tight on its enlarged end. For this purpose, the interior of one or both of the flanges, 4 and 5, are counter-bored as at 10, to form a recess within which the enlarged end, 7, of the nipple, 6, may extend when the small end of the nipple is being inserted into the collar at the threaded end, 9. The threaded connections, 8 and 9, at opposite ends of the nipple are preferably made of the same gage and direction so that both threads may be screwed up at the same time if desired. One of the flanges may also be provided with a circular rib, 11, engaging a corresponding recess and gasket, 12, in the other flange when the same are tightly clamped together by means of the bolts, 13.

When a buried pipe line is to be repaired or cut for any purpose, the portion to be removed is uncovered, and the defective or the required length of pipe is cut out. If the projecting ends of the pipe line are then without threaded connections, threads may be cut upon these ends with the usual tools, and a collar screwed upon one of them. The annular flange, 4, of our improved coupling, having a regular threaded connection, may then be screwed tightly upon the end of the other pipe section where there is no collar. The other flange, 5, with the nipple screwed into place therein is then temporarily bolted to the fixed flange, 4, in order to take a measurement for the length of pipe, 2, necessary to close the gap from the nipple to the end of the pipe carrying the collar (not shown). The flange, 5, and nipple are then removed, and the pipe, 2, of the desired length, with collar, 3, on the end toward the nipple, is screwed into place in the other collar. This leaves the coupling to be completed with the flange, 5, and nipple, 6, which is then readily done by sliding the flange onto the nipple over the small end, and inserting the enlarged end, 7, of the nipple into the recess, 10, within the flanges a sufficient distance to allow the end threaded at 9 to enter the collar, 3. The threads, 9 and 8, may then be screwed up together or the thread, 9, may first be screwed up tight and the flange, 5, then turned up on thread, 8, after which the bolts, 13, are put in place, and the two flanges clamped together completing the coupling.

The nipple piece may be of any desired short length such as may be conveniently handled according to the diameter of the pipe to be coupled, and in cases where the piece of pipe cut out is very short it may be possible to couple up the ends by means of the improved nipple piece and flanges without inserting an additional measured length of pipe. It will also be apparent that the flange 4, is not necessarily a separate flange, as it may be the flange of a valve, T, L, or other fitting having a flanged end.

It will now be seen that our improved coupling is of a simple and durable construction which may readily be inserted to reunite the ends of a pipe line where a cut has been made for any reason, or where it is necessary to replace a defective section.

Having now described our invention, what we claim as new and desire to secure by Letters Patent is:

In a pipe coupling, the combination of a flange member having a pipe connection, another independently rotatable flange member having a threaded opening, a detachable nipple having an enlarged threaded end fitting said threaded opening, and its smaller end being provided with a thread of the same gage and direction, said flange member also having a recess for the retraction of the nipple, and means for clamping said flange members together longitudinally without relative rotation.

In testimony whereof we have hereunto set our hands.

GEORGE H. COBB.
ADAM DRUMTRA.

Witnesses:
H. R. ROWE,
A. E. RAPP.